United States Patent
Joseph et al.

(10) Patent No.: US 9,726,537 B2
(45) Date of Patent: Aug. 8, 2017

(54) SYSTEMS AND METHODS FOR DETERMINING AMBIENT ILLUMINATION HAVING A BYPASS SWITCH

(71) Applicant: Smart Fos, Inc., Sunnyvale, CA (US)

(72) Inventors: Neil Joseph, Sunnyvale, CA (US); Francis Joseph, Sunnyvale, CA (US)

(73) Assignee: Stack Labs, Inc., Sunnyvale, CA (US)

( * ) Notice: Subject to any disclaimer, the term of this patent is extended or adjusted under 35 U.S.C. 154(b) by 176 days.

(21) Appl. No.: 14/923,623

(22) Filed: Oct. 27, 2015

(65) Prior Publication Data

US 2016/0123804 A1      May 5, 2016

Related U.S. Application Data

(60) Provisional application No. 62/073,471, filed on Oct. 31, 2014.

(51) Int. Cl.
*G01J 1/42*     (2006.01)
*G01J 1/44*     (2006.01)

(52) U.S. Cl.
CPC .............. *G01J 1/44* (2013.01); *G01J 1/4204* (2013.01); *G01J 2001/4238* (2013.01); *G01J 2001/446* (2013.01)

(58) Field of Classification Search
CPC ...... G01J 1/4204; G01J 1/1626; G01J 1/4228; G01J 2001/4238
USPC ................................ 250/214 AL, 214 R, 221
See application file for complete search history.

(56) References Cited

U.S. PATENT DOCUMENTS

| | | | |
|---|---|---|---|
| 8,363,707 B2 | 1/2013 | Hollis | |
| 8,436,287 B2 * | 5/2013 | Engstrand | G01J 1/02 250/205 |
| 2005/0117190 A1 | 6/2005 | Iwauchi et al. | |
| 2007/0188427 A1 | 8/2007 | Lys et al. | |
| 2007/0211013 A1 | 9/2007 | Uehara et al. | |
| 2010/0277068 A1 | 11/2010 | Broitzman | |
| 2011/0202151 A1 | 8/2011 | Covaro et al. | |
| 2012/0080944 A1 | 4/2012 | Recker et al. | |
| 2012/0170284 A1 | 7/2012 | Shedletsky | |
| 2012/0319585 A1 | 12/2012 | Shteynberg et al. | |

FOREIGN PATENT DOCUMENTS

| | | |
|---|---|---|
| WO | 2010/068538 A1 | 6/2010 |
| WO | 2013/138613 A1 | 9/2013 |

* cited by examiner

*Primary Examiner* — Que T Le
(74) *Attorney, Agent, or Firm* — Jones Day

(57) ABSTRACT

Systems and methods are provided for measuring an ambient light level in a volume that is lighted by a pulsating light source. A first light sensor is configured to generate a first signal based on an amount of light detected in the volume. A bypass switch is configured to bypass the first light sensor at a first point in time when the light source is on and to not bypass the first light sensor at a second point in time when the light source is off. A second sensor is configured to generate a second signal based on an environment in the volume, and a difference circuit is configured to determine a difference magnitude between the second signal and the first signal to generate an ambient light signal.

20 Claims, 7 Drawing Sheets

SYSTEMS AND METHODS FOR DETERMINING AMBIENT ILLUMINATION HAVING A BYPASS SWITCH

CROSS-REFERENCE TO RELATED APPLICATIONS

The present application claims the benefit of priority to U.S. Provisional Patent Application No. 62/073,471, filed Oct. 31, 2014, entitled "Systems and Methods for Determining Ambient Illumination," the entirety of which is incorporated by reference herein.

FIELD

This disclosure is related generally to lighting and more particularly to providing a desired light level based on an ambient light detector.

BACKGROUND

An energy savings can be realized through automated adjustment of artificial lighting (e.g., LED, fluorescent, incandescent) to match a desired lighting level, such that the artificial lighting is not powered more than necessary to reach that desired level. In certain environments, ambient light (e.g., light from the sun or other sources) influences a total level of ambient light in a volume to be lit, which in turn influences the amount of light that must be output by the artificial lighting to match the desired light level. To further complicate matters, such external sources may vary their contributions over time (e.g., the sun contributes zero light to a room at night, but produces significant light during the day through a window). Detection of ambient light for adjustment of an artificial light source is made especially difficult in arrangements where it is desirable to place an ambient light detector in close proximity (e.g., near or within) to an artificial light source due to the interference of light from the artificial light source with the ambient light sought to be detected.

SUMMARY

Systems and methods are provided for measuring an ambient light level in a volume that is lighted by a pulsating light source. A first light sensor is configured to generate a first signal based on an amount of light detected in the volume. A bypass switch is configured to bypass the first light sensor at a first point in time when the light source is on and to not bypass the first light sensor at a second point in time when the light source is off. A second sensor is configured to generate a second signal based on an environment in the volume, and a difference circuit is configured to determine a difference magnitude between the second signal and the first signal to generate an ambient light signal.

As a another example, a method of measuring an ambient light level in a volume that is lighted by a pulsating light source includes generating a first signal based on an amount of light detected in the volume by a first light sensor. A bypass switch is controlled to bypass the first light sensor at a first point in time when the light source is on and to not bypass the first light sensor at a second point in time when the light source is off. A second signal is generated based on an environment in the volume detected by a second sensor. An ambient light level is determined based on a difference magnitude between the second signal and the first signal.

DETAILED DESCRIPTION

Figure 1:
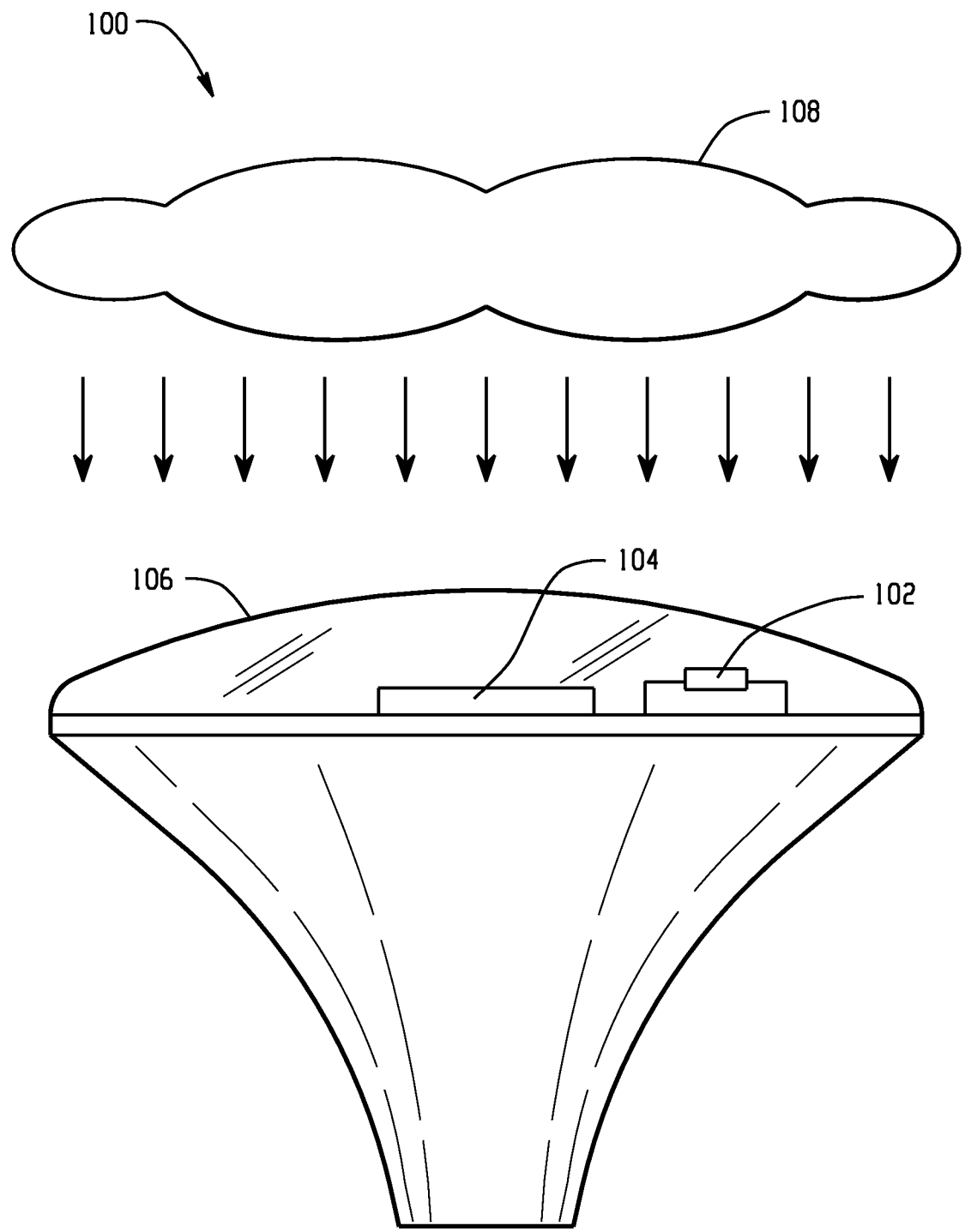
FIG. 1 is a block diagram depicting a light source that includes an ambient light sensor.

FIG. 1 is a block diagram depicting a light source that includes an ambient light sensor. Smart-lighting systems adjust the level of lighting provided by lighting sources based on user preferences. For example, a user can set a desired level of lighting in a volume, such as a room, and the system will attempt to match that level. By not providing more light than is desired, the system can limit power consumption. In one embodiment, a lighting system includes a network of lights, where a plurality of light sources (e.g., light bulbs) are configured for wireless communication with each other or a base (e.g., server) system. The light sources receive a desired lighting level, such as from the base system and utilize a local ambient light sensor, such as a sensor within the light source, to adjust the level of light produced to match the desired level. In one example, each light source includes an adjustable LED light source and an ambient light sensor in close proximity to the light source.

FIG. 1 is an example of such a light, where a light 100 includes a light sensor 102 positioned in close proximity to a light source without an optical barrier between the light sensor 102 and the light source 104. The light source 104 is configured to output light that is typically in the range of up to 100,000 lux. However, in some implementations light sources can be configured to produce brighter or dimmer light. The light sensor 102 and the light source 104 are positioned within a standalone light bulb 100 (e.g., a light bulb configured for wireless communication with other light bulbs or a base server), surrounded in a direction of light transmission by a light diffuser 106.

The light 100 of FIG. 1 is configured to output light to match a given parameter, such as a user brightness parameter. To determine whether the current lighting level in the volume (e.g., room) is at the desired level, the light sensor 102 is configured to measure a light level in the room. The close proximity to the light source 104 introduces a difficulty where light from the light source 104 prevents the light sensor 102 from measuring a light level in the volume (the ambient light level 108, typically in the range of 0 to 500 lux), instead only detecting light from the nearby source 104. This problem is exacerbated by darker ambient light conditions typically calling for brighter output by the light source 104. To enable detection of the ambient light level 108, the light source 104 operates using a duty cycle, where the light source is pulsed on and off at a known interval, with the light sensor 102 taking measurements of the ambient light level 108 during times when the light source 104 is off. However, in some embodiments, such measurement during light source off times is insufficient for accurate ambient light measurements, as the light sensor 102 is unable to get an accurate reading of ambient light 108 during the short period of time that the light source 104 is off. Lengthening the off time period of the light source 104 can provide sub-optimal results, such as detectable flickering of the light source 104 (e.g., when the light source is off for more than 500 microseconds in a cycle). A pulse width of 250 microseconds or less often provides good results.

Figure 2:
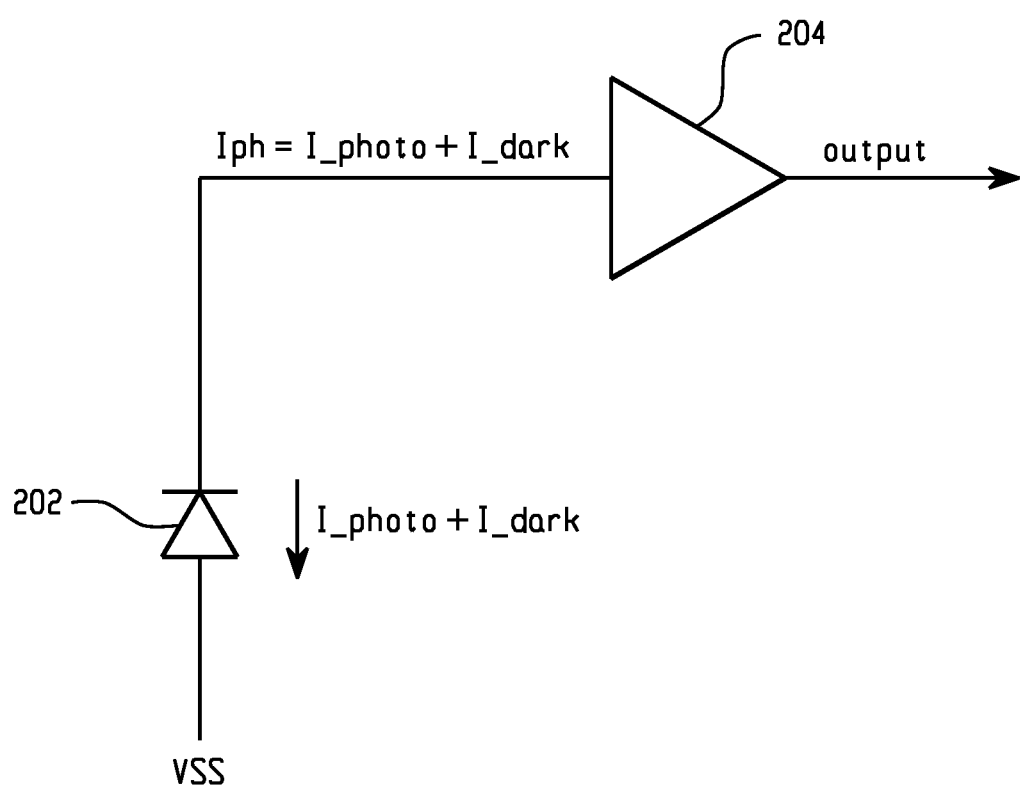
FIG. 2 is a diagram depicting an example light sensor for detecting ambient light.

Certain systems and methods as described herein provide for a light sensor that can more accurately detect ambient light during off time periods of a light source. FIG. 2 is a diagram depicting an example light sensor for detecting ambient light. The example of FIG. 2 includes a photodiode 202 connected to an amplifier 204. The photodiode 202 acts as a current source. The photodiode 202 produces some current (I_dark) based on non-light ambient conditions, such as temperature. Additionally, upon excitation by photons, the photodiode produces some additional current (I_photo). The amplified output of the photodiode 202 (e.g., during off periods of a light source duty cycle) can be utilized to adjust a light level produced by a light source in an attempt to match a desired ambient light level.

While the example of FIG. 2 provides adjustment based on a measured ambient light level, that measurement can sometimes be of insufficient accuracy. For example, the configuration of FIG. 2 is sometimes considered suboptimal based on its inability to account for the I_dark current (dark current) in adjusting light source power. In implementations where the dark current is large (e.g. 10% or more of I_photo (light current)), the lack of accounting for the dark current makes the photodiode output a less than optimal measurement of the ambient light level.

Figure 3:
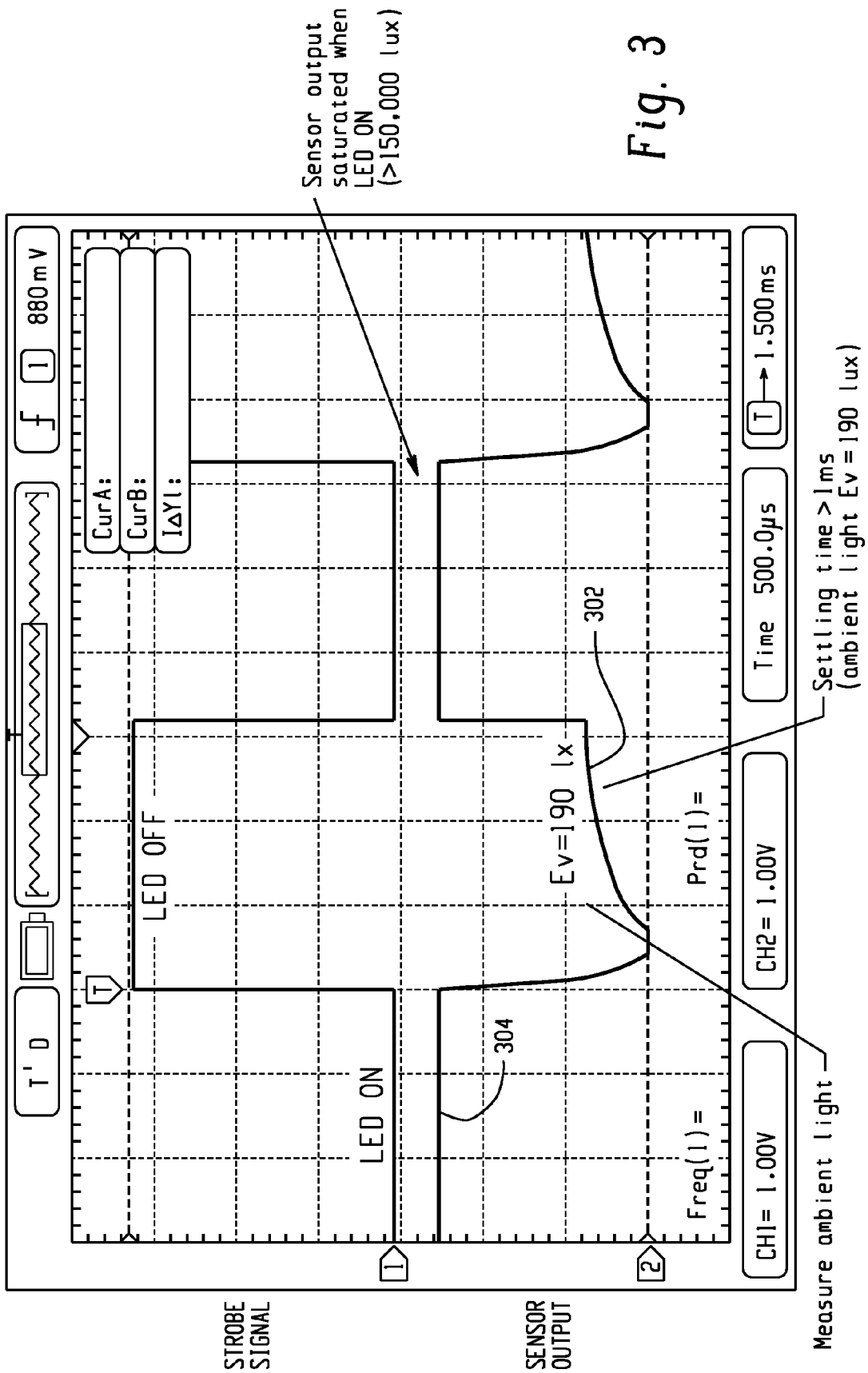
FIG. 3 is a diagram depicting a long settling time of the photodiode output during the time period when the light source is off.

Additionally, the light sensor of FIG. 2 may not be able to adequately handle a bright light source (e.g., a 100,000 lux light source) in a low ambient light environment (e.g., a 500 lux ambient light environment). When the light source is on, a large number of electronic charges are generated by the photodiode 202. When a "strobe pulse" is applied, the light source is turned off for a short period of time. However, when the light source is off, there is no mechanism to quickly discharge the charges that were generated when the light source was on. FIG. 3 is a diagram depicting a long settling time of the photodiode output at 302 during the time period when the light source is off. Based on the close proximity of the light sensor and the light source, the photodiode is saturated, as indicated at 304, when the light source is on. Because the photodiode output has still not settled at the end of the light source off period, the photodiode does not produce an accurate measurement of ambient light. Lengthening the width of the light source off time period is undesirable, where such lengthening can cause an undesirable flickering effect.

Figure 4:
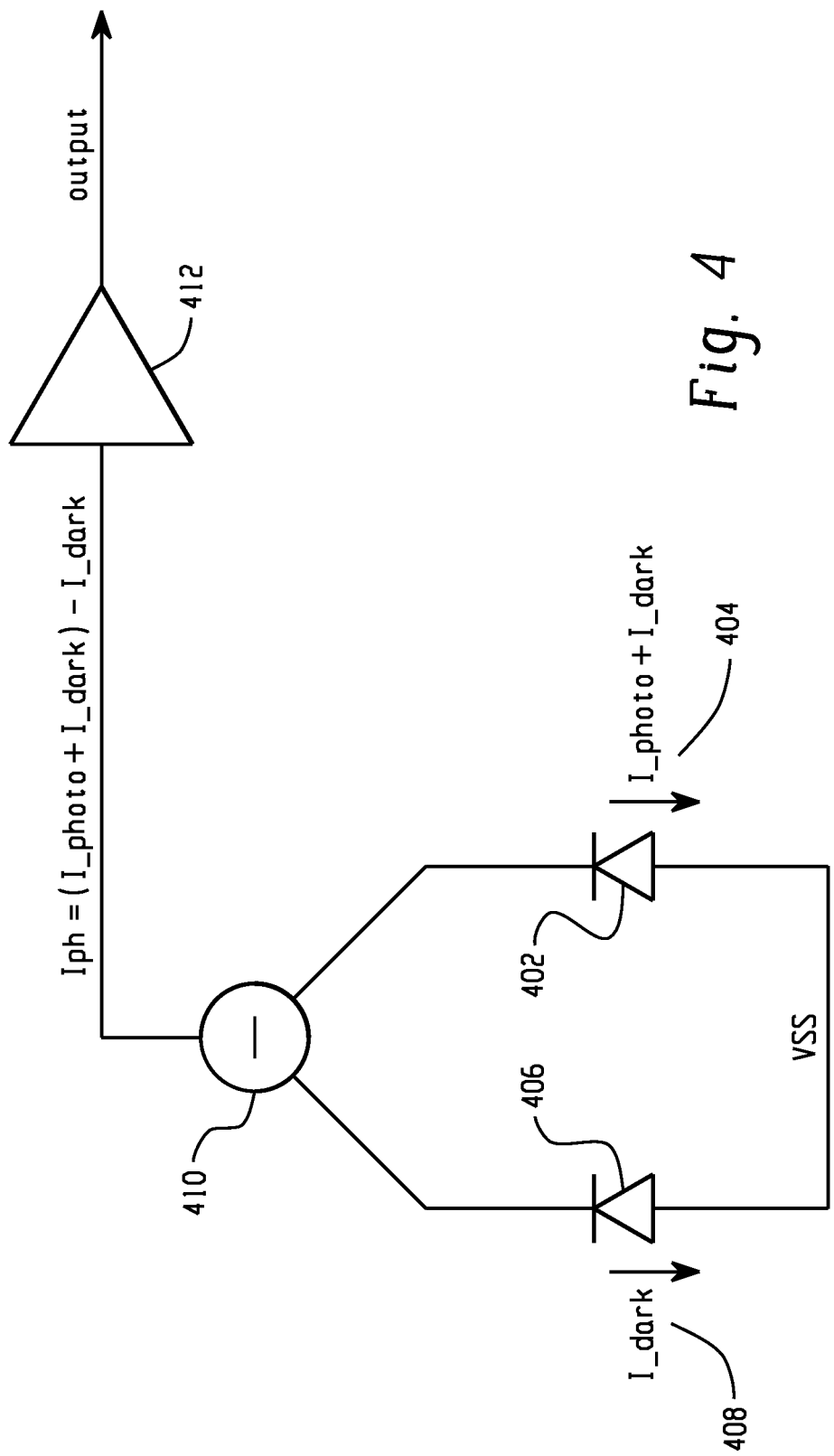
FIG. 4 is a diagram depicting a light sensor that includes a dark diode configured for dark current compensation.

FIG. 4 is a diagram depicting a light sensor that includes a dark diode configured for dark current compensation. The light sensor of FIG. 4 includes a first light sensor (photo diode) 402 that is configured to generate a first signal 404 based on an amount of light detected in the volume (I_photo) and an environment in the volume (I_dark). The light sensor further includes a second sensor (dark diode) 406 configured to generate a second signal 408 that is based on the environment in the volume (I_dark).

In one implementation, the dark diode 406 is formed using a photo diode that is equivalent (or identical) to photodiode 402, where the dark diode 406 has its photo detecting area covered with metal or other non-light permeable material. With no photons from any source reaching the photo detecting area of dark diode 406, the signal 408 produced by dark diode 406 is based only on the environment in which the dark diode 406 sits. With dark diode 406 being positioned near photodiode 402, I_dark of both the dark diode 406 and the photodiode 402 should be substantially equal.

The light sensor of FIG. 4 further includes a subtractor 410 that subtracts the current from the dark diode 406 from the current from the photodiode 402 to generate a signal that includes substantially only I_photo (e.g., (I_photo+I_dark)−I_dark=I_photo). That I_photo signal is amplified at 412 and outputted as a signal indicative of a detected level of ambient light that can be used to adjust a light output of an associated light source. The light sensor of FIG. 4 provides improved light sensing performance over a range of environmental parameters, such as varying volume and light source temperatures.

Figure 5:
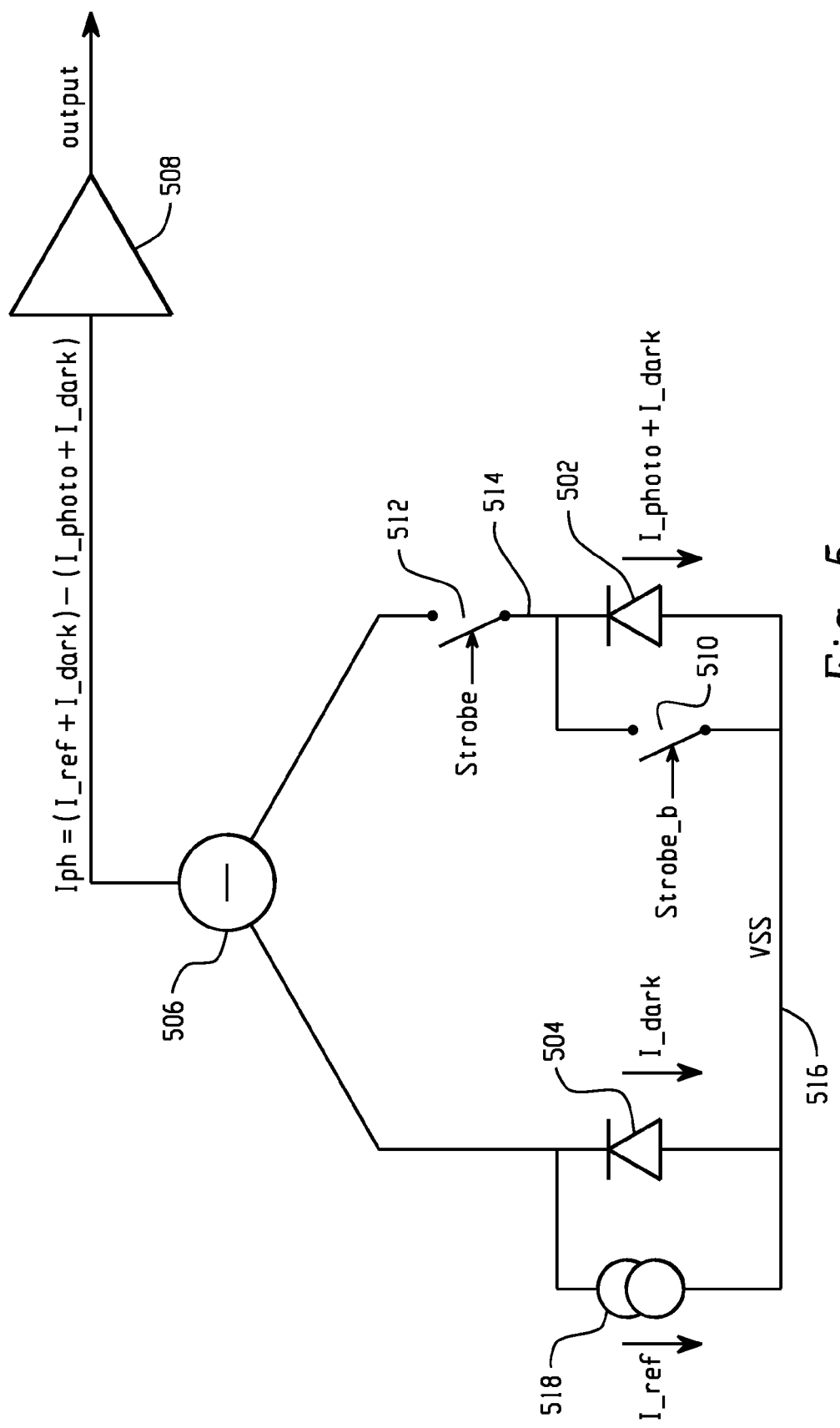
FIG. 5 is a diagram depicting a light sensor configured for reduced sensor transient periods.

FIG. 5 is a diagram depicting a light sensor configured for reduced sensor transient periods. As mentioned above, the saturation of a light sensor positioned close to a light source when the light source is on can be detrimental to detection of an ambient light level during the short time periods when the light source is off. This is based on a transient period of the light sensor being longer than the off time period of the light source. The example of FIG. 5 includes a plurality of switches for improving discharge of current produced by the photo diode during the on period of the light source. The example of FIG. 5 includes a first light sensor (photo diode) 502 configured to generate a first signal (I_photo; light current) based on an amount of light detected in the volume. The signal generated by the photo diode 502 also includes a portion (I_dark; dark current) based on an environment in the volume. To compensate for the dark current, a second sensor (dark diode) 504 is configured to generate a second (I_dark) signal based on the environment in the volume. A subtractor circuit 506 is configured to generate an output signal that is based on a difference of the first signal from the photo diode 502 and the second sensor 504 that does not include the dark current component. That signal is amplified at 508 and is provided as a signal indicative of the ambient light in a volume to be lit that can be used to adjust a power level of the light source.

The light sensor of FIG. 5 includes one or more switches 510, 512 that are configured to reduce the transient period for the light sensor by discharging current generated based on the light source and not ambient light conditions. A bypass switch 510 is configured to bypass the first light sensor 502 at a first point in time when the light source is on, and to not bypass the first light sensor 502 at a second point in time when the light source is off. By providing a short circuit from node 514 to ground 516 when the light source is on, a substantial portion of current generated by the first light sensor, photo diode 502, as a result of the light source is shorted to ground. When the light source is turned off (e.g., by assertion of a high strobe pulse), the bypass switch is opened. Additionally, in one embodiment, when the light source is off, a second switch 512 is closed, enabling a flow of current from the first light sensor 502 to the subtractor circuit 506. When the light source is on, the second switch 512 is opened, preventing any adverse effects from the shorting of the photo diode 502 to ground 516 via switch 510.

The implementation of FIG. 5 includes an additional feature for decreasing the transient period (settling time) of the light sensor. In some experiments, it is shown that the settling time of a light sensor is proportional to the level of light detected. For example:

$$t\_settle = C*V/I\_photo,$$

where C and V are constants. As measured light decreases, the settling time increases. To combat this increased settling time in scenarios with low level light detection, a reference current 518 can be introduced into the system and the subtraction operation of subtractor 506 can be reversed. Where the implementation of FIG. 4 subtracted the dark diode branch current from the photo diode branch current, the implementation of FIG. 5 subtracts the right, photo diode branch current from the left dark diode branch current. Thus, the subtractor 506 outputs a signal equal to the dark diode branch current (I_ref+I_dark) minus the photo diode branch current (I_photo+I_dark), resulting in an output signal Iph according to:

$$Iph=(I\_ref+I\_dark)-(I\_photo+I\_dark)=I\_ref-I\_photo$$

Instead of being proportional to I_photo, the light sensor settling time is proportional to (I_ref−I_photo) (e.g., t_settle=C*V/(I_ref−I_photo). Such a signal has a longer settling time in scenarios having high ambient light detection levels (I_photo) and shorter settling times in low light detection scenarios. The reference current 518 level can be adjusted to realize an acceptable settling time (e.g., less than the off time period of the light source) across a range of expected ambient light levels, with light source power adjustment circuitry being modified accordingly.

Figure 6:
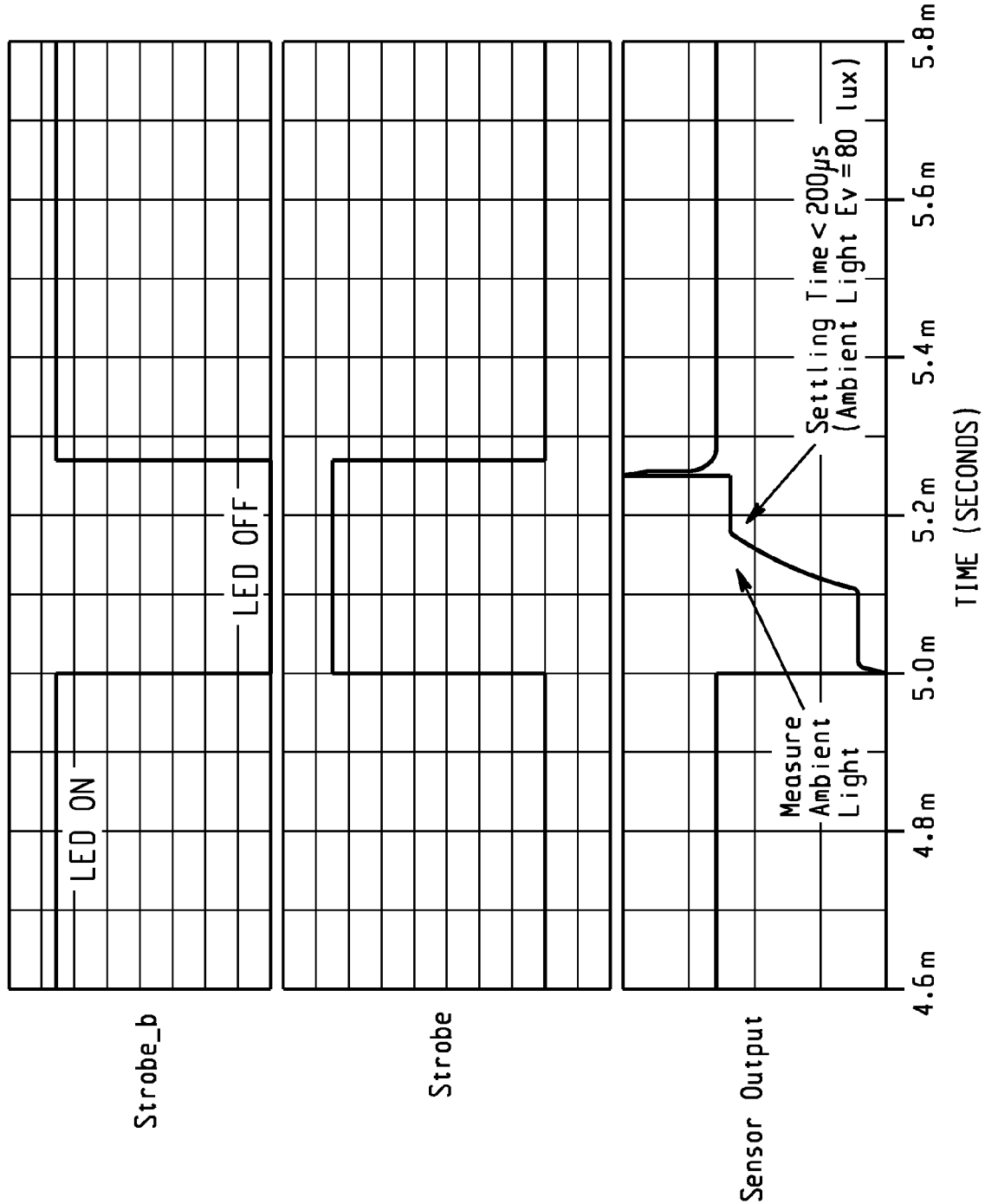
FIG. 6 is a diagram depicting a short settling time of a light sensor implemented according to FIG. 5.

FIG. 6 is a diagram depicting a short settling time of a light sensor implemented according to FIG. 5 in the presence of an 80 lux level of ambient light, where the light sensor output settles substantially before the end of the light source off time period, enabling accurate adjustment of the light source to match a desired ambient light level.

Figure 7:
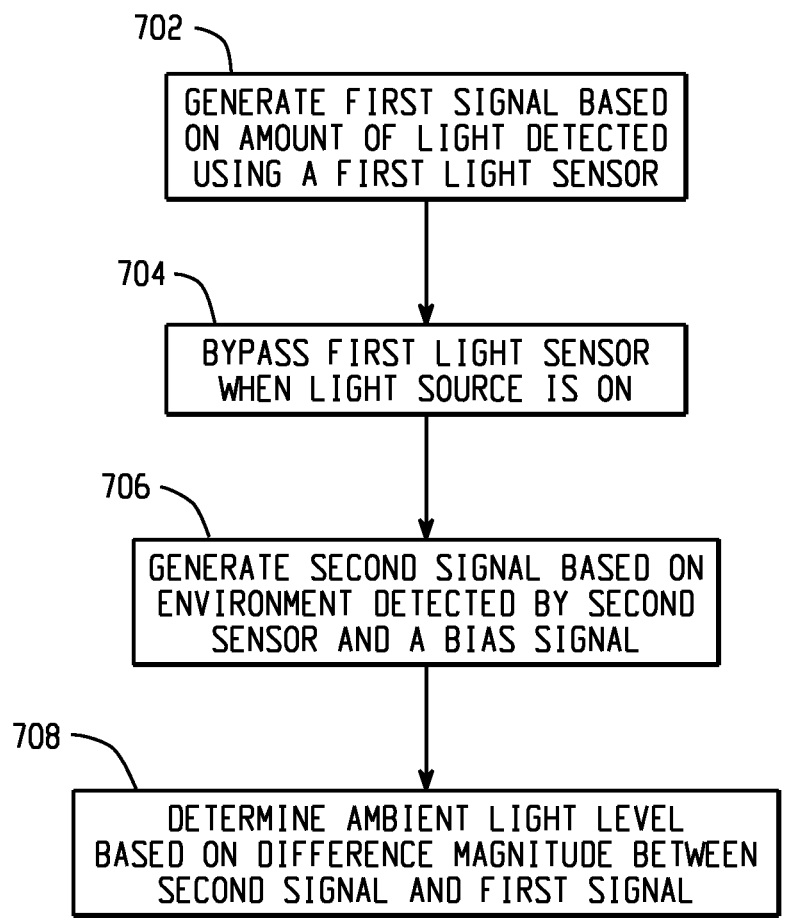
FIG. 7 is a flow diagram depicting a method of measuring an ambient light level in a volume that is lighted by a pulsating light source.

FIG. 7 is a flow diagram depicting a method of measuring an ambient light level in a volume that is lighted by a pulsating light source. The method includes includes generating a first signal based on an amount of light detected in the volume by a first light sensor at 702. At 704, a bypass switch is controlled to bypass the first light sensor at a first point in time when the light source is on and to not bypass the first light sensor at a second point in time when the light source is off. At 706, a second signal is generated based on an environment in the volume detected by a second sensor. At 708, an ambient light level is determined based on a difference magnitude between the second signal and the first signal.

Examples have been used to describe the invention herein, and the scope of the invention may include other examples.

It is claimed:

1. A system for measuring an ambient light level in a volume that is lighted by a pulsating light source, comprising:
    a first light sensor configured to generate a first signal based on an amount of light detected in the volume;
    a bypass switch configured to bypass the first light sensor at a first point in time when the light source is on and to not bypass the first light sensor at a second point in time when the light source is off;
    a second sensor configured to generate a second signal based on an environment in the volume;
    a difference circuit configured to determine a difference magnitude between the second signal and the first signal to generate an ambient light signal.

2. The system of claim 1, wherein the first light sensor is a photo diode, wherein the second sensor is a covered photo diode.

3. The system of claim 2, wherein the covered photodiode includes a photo detecting area, wherein the photo detecting area is covered to prevent photons from reaching the photo detection area.

4. The system of claim 1, further comprising:
    a second switch between the first light sensor and the difference circuit, wherein the second switch is configured to be open at the first point in time.

5. The system of claim 1, wherein the bypass switch is closed at the first point in time, and wherein the bypass switch is open at the second point in time.

6. The system of claim 1, further comprising a bias source, wherein the second signal further generated based on the bias source.

7. The system of claim 6, wherein the difference circuit is a subtractor circuit, wherein the subtractor circuit generates the ambient light signal by subtracting the first signal from the second signal.

8. The system of claim 6, wherein an ambient light level is based on a difference between a level of the bias source and a level of the ambient light signal.

9. The system of claim 1, wherein the bias source is a current source, wherein the first signal is a current generated by the first light sensor, and wherein the second signal is a current generated by the second sensor.

10. The system of claim 1, wherein the first signal and the second signal vary by temperature.

11. The system of claim 1, further comprising an amplifier configured to amplify the ambient light signal prior to output.

12. The system of claim 1, wherein the pulsating light source is off for less than one millisecond at a time.

13. The system of claim 1, wherein the first light sensor is positioned between one quarter of an inch and one inch of the pulsating light source.

14. The system of claim 1, wherein the pulsating light source is a light emitting diode.

15. The system of claim 1, wherein the light source is configured to output 1,000 lux or more.

16. A method of measuring an ambient light level in a volume that is lighted by a pulsating light source, comprising:
    generating a first signal based on an amount of light detected in the volume by a first light sensor;
    controlling a bypass switch to bypass the first light sensor at a first point in time when the light source is on and to not bypass the first light sensor at a second point in time when the light source is off;
    generating a second signal based on an environment in the volume detected by a second sensor;
    determining an ambient light level based on a difference magnitude between the second signal and the first signal.

17. The method of claim 16, further comprising, controlling a second switch positioned between the first light sensor and a difference circuit configured to determine the difference in magnitude, the second switch configured to be open at the first point in time.

18. The method of claim 16, wherein the bypass switch is closed at the first point in time, and wherein the bypass switch is open at the second point in time.

19. The method of claim 16, further comprising generating a bias signal, wherein the second signal is further generated based on the bias signal.

20. The method of claim 19, wherein the ambient light level is determined based on a difference between a level of the bias source and an ambient light signal generated by subtracting the first signal from the second signal.

\* \* \* \* \*